United States Patent [19]

Vignot

[11] 4,120,429
[45] Oct. 17, 1978

[54] DISPENSING PUMP HAVING BELLOWS METERING CHAMBER

[75] Inventor: André Vignot, Coubron, France

[73] Assignee: Societe Prodene, Vaujours, France

[21] Appl. No.: 789,432

[22] Filed: Apr. 20, 1977

[30] Foreign Application Priority Data

Apr. 23, 1976 [FR] France .................................. 76 11999
Jan. 6, 1977 [FR] France .................................. 77 00234

[51] Int. Cl.² ............................................. B67D 5/42
[52] U.S. Cl. ................................... 222/207; 222/321; 222/383
[58] Field of Search ............... 222/207, 209, 320, 321, 222/383, 385

[56] References Cited

U.S. PATENT DOCUMENTS

3,144,177   8/1964   Cookson .......................... 222/385 X

FOREIGN PATENT DOCUMENTS

1,459,735   11/1966   France ..................................... 222/207

Primary Examiner—David A. Scherbel
Attorney, Agent, or Firm—Michael J. Striker

[57] ABSTRACT

This device for dispensing metered amounts of liquid or pasty products comprises, in a hollow body connected to a reservoir filled with the product to be dispensed, a chamber consisting of a bellows forming the delivery and suction member enclosed in a sleeve acting as a guide member to the stem of a control push member; the bellows enclosing in turn a return spring and having at its end adjacent the port connecting the reservoir to the chamber an annular reinforcement surrounding a central, normally closed inlet valve urged to its closed position by another return spring; the stem of the control push member opposite this valve, which stem is hollow and carries a head enclosing another valve for controlling the delivery of product to a dispensing nozzle, this arrangement preventing any back flow of product to the reservoir and dispensing with the conventional rigid piston and seal arrangement to eliminate leakages and extend the useful life of the device.

16 Claims, 7 Drawing Figures

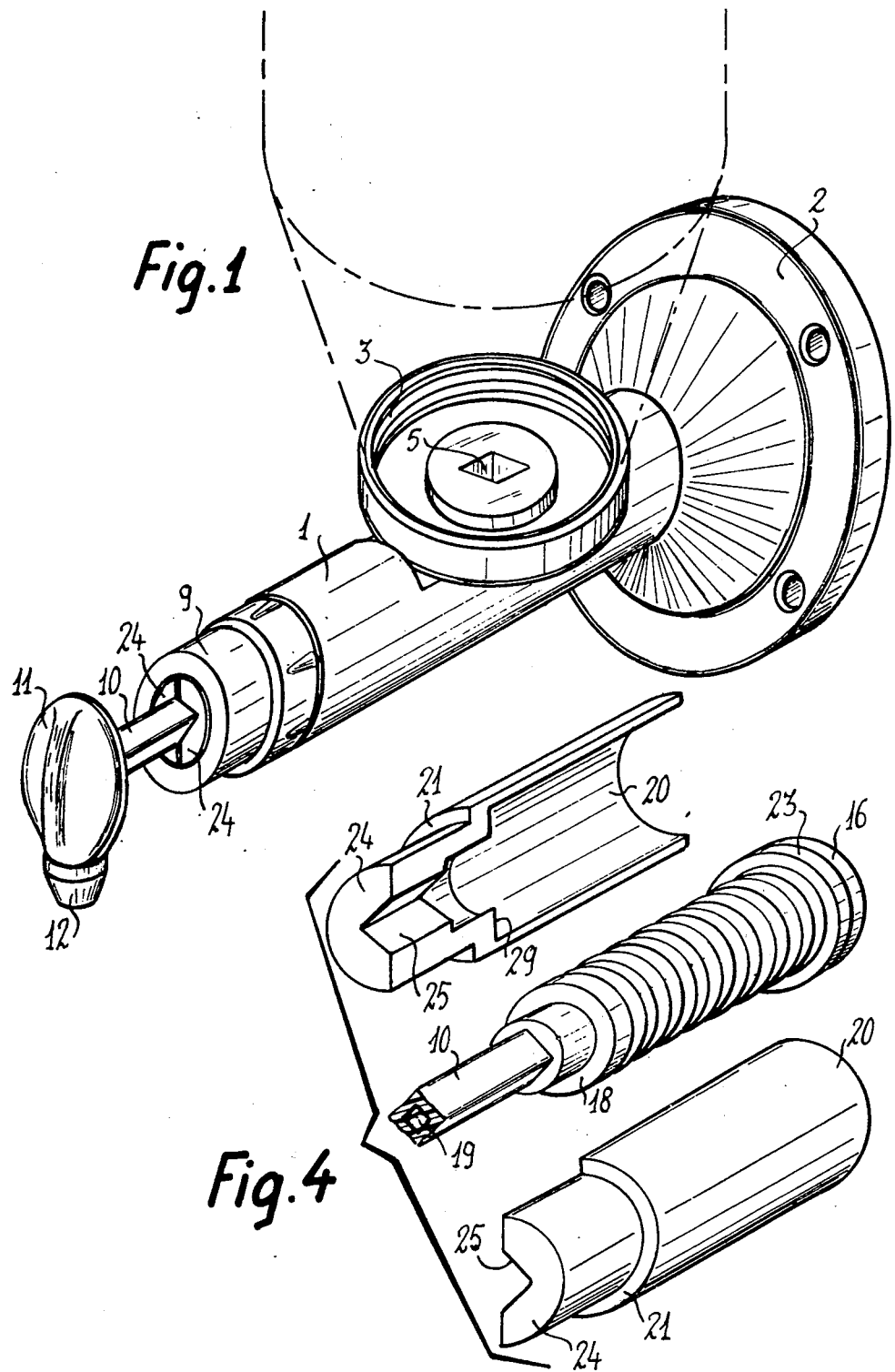

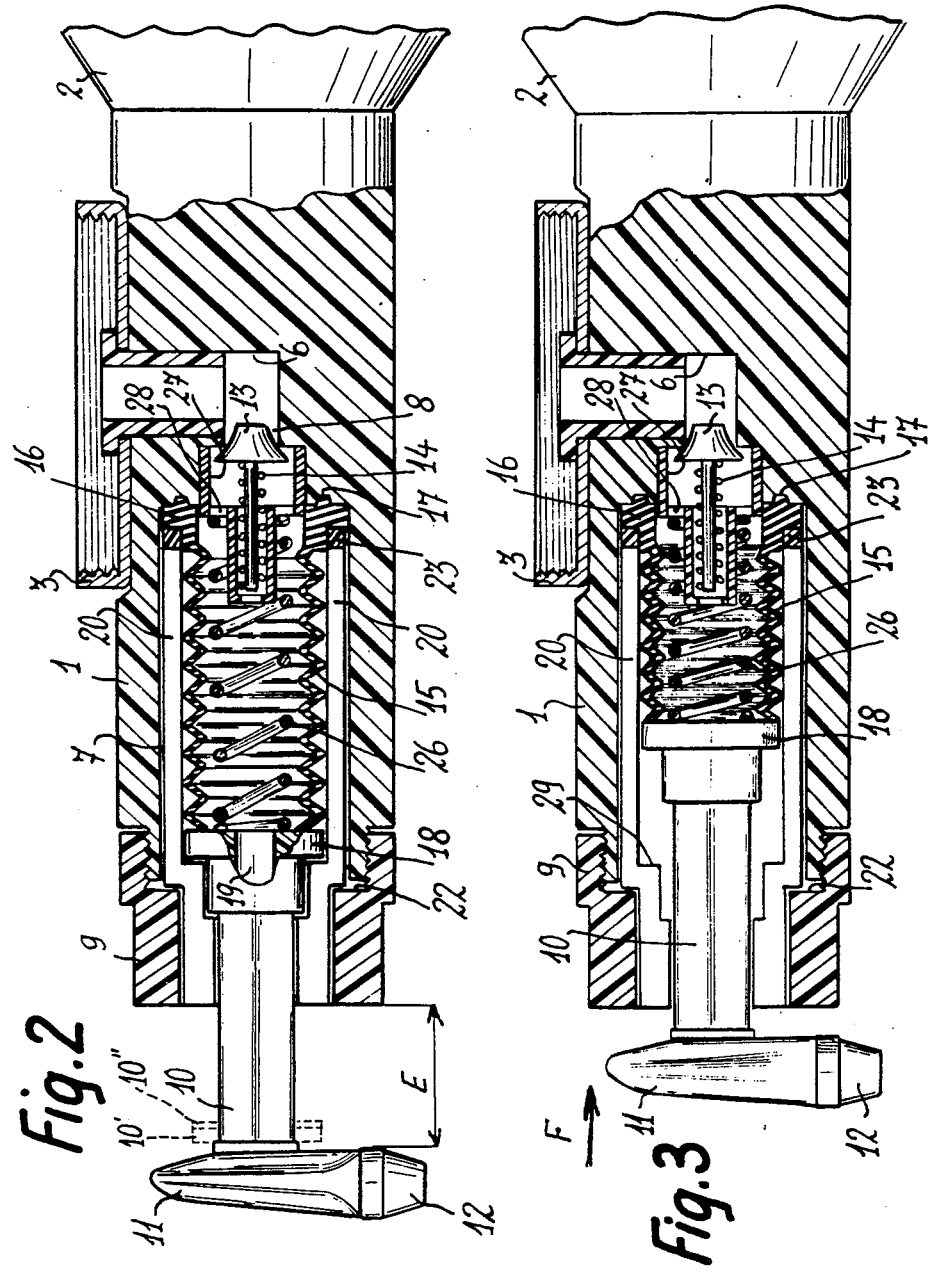

DISPENSING PUMP HAVING BELLOWS METERING CHAMBER

BACKGROUND OF THE INVENTION

The present invention relates to devices for dispensing and metering liquid or pasty products, such as liquid soaps, cleaning pastes, and the like.

In general, devices of this character are adapted to be associated or coupled with a detachable reservoir containing the product to be dispensed. The body of this device comprises an internal dispensing chamber communicating through a pair of valves on the one hand with the orifice opening into the reservoir and on the other hand with the outlet nozzle. A suction and delivery piston actuated by means of an external control push member is fitted in said chamber. The outlet nozzle is advantageously disposed on the head of said push member having like the piston a hollow stem or rod.

During the operative or delivery stroke of the piston a metered amount of product contained in said chamber is strongly compressed. Now, the valve arrangement is such that this compression opens the outlet valve and keeps the inlet valve in its closed or seated position. Therefore, this action causes the metered amount of product contained in the dispensing chamber to be ejected through the outlet nozzle.

On the other hand, when the piston is returned to its normal or inoperative position by spring means provided for this purpose the valve associated with the outlet nozzle remains closed while the valve controlling the communication with the inner space of the reservoir is open. Consequently, a predetermined quantity of product is sucked into the chamber of the device. Therefore, this suction takes place immediately when releasing the control push member, so that the corresponding metered amount of product remains in a waiting condition in said dispensing chamber until the device is actuated again.

In a known arrangement the dispensing and metering device comprises a bellows-like tube associated with the control push member. It is obvious that this device cannot operate properly for dispensing relatively thick creams, inasmuch as the bellows may further undergo undesired and detrimental distortions in actual service.

Thus, a known inconvenience of these prior art devices is that their operation cannot be fully satisfactory. On the other hand, their useful life is estremely short, since they become useless after a relatively short service time.

This is due to the fact that in many cases a poor fluid tightness is observed around the control piston due to a failure or, more generally, a premature wear of the piston seal. In fact, this piston seal wears out very rapidly, notably when the product to be dispensed contains abrasive substances as in many applications.

Under these conditions, apparatus or devices of this type become rapidly useless.

SUMMARY OF THE INVENTION

It is therefore an object of the present invention to provide a dispensing and metering device eliminating completely the above-mentioned inconveniences.

The device according to this invention for dispensing and metering liquid or pasty products comprises a control push member operatively connected to a delivery and suction member disposed in a chamber communicating via a pair of valve members on the one hand with an orifice opening into an inlet passage for the product to be dispensed and on the other hand with an outlet nozzle incorporated in said push member, said delivery and suction member consisting of a pleated or bellows-like tube of resilient plastic material having one end fastened to the hollow rigid stem of said control push member and another end engaged in a fluid-tight manner against the edges of the inlet orifice of the chamber of the device.

According to this invention, this dispensing device is characterized essentially in that a return spring disposed within said bellows-forming tube constantly urges this tube and the push member to their inoperative position, and that the bellows forming tube constituting the delivery and suction member is disposed within a rigid coaxial sleeve engaging with one end the tube end urged in fluid-tight manner against the seat-forming edge of the inlet orifice of said chamber and having its opposite end rigidly attached to the corresponding end of said chamber adjacent said control push member.

With this arrangement, the pleated resilient tube is adapted to operate very satisfactorily both during the sucking of a metered quantity of product and during the subsequent forced delivery of the same quantity. Moreover, a reliable fluid-tightness is obtained around the inlet orifice of the chamber, and this fluid-tightness is not likely to be subsequently impaired for instance in case of intense use of the device.

The various advantages and features characterizing this device will appear more clearly as the following description proceeds with reference to the accompanying drawing showing a typical and exemplary form of embodiment of the device of this invention.

BRIEF DESCRIPTION OF THE DRAWINGS

FIG. 1 is a perspective view of the dispensing and metering device according to this invention;

FIG. 2 is an axial section showing the same device with the suction and delivery member, and consequently the control push-member, in their waiting position;

FIG. 3 is a view similar to FIG. 2 showing the device during the actuation of the push member for ejecting a metered amount of product from the device;

FIG. 4 is a perspective view showing the suction and delivery member and two portions of the longitudinal guide sleeve surrounding this member;

DESCRIPTION OF PREFERRED EMBODIMENTS

Figure 6:
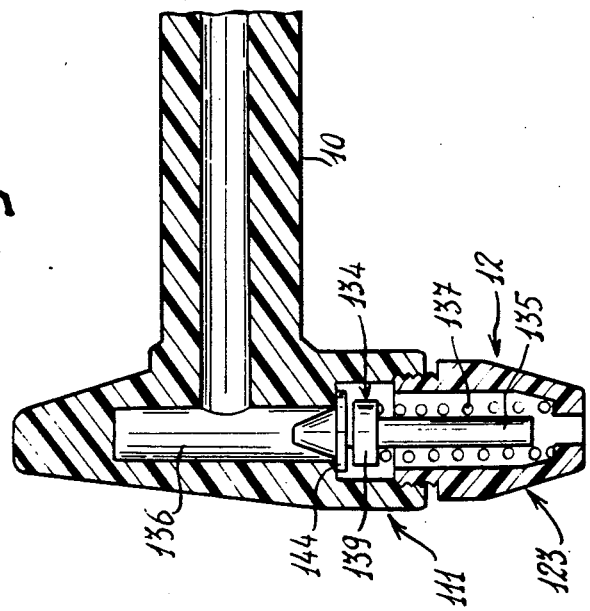
FIG. 6 is a side-elevational, part-sectional view of the head and stem of the push member of this device, showing a typical embodiment of the dispensing valve means incorporated in the head of this push member.

The device according to this invention for dispensing and metering liquid or semi-liquid or pasty products comprises a body 1 of substantially cylindrical shape having one end rigidly connected to a circular flange 2 adapted to be fastened to a wall, partition or other support. The upper portion of this body 1 carries an internally screw-threaded fixed union 3 to which the correspondingly externally screw-threaded neck of a reservoir 4 containing the liquid or pasty product to be dispensed is adapted to be secured by screwing. This union 3 is retained on the body 1 by means of a crimped flange formed at the outer end of a tubular member 5 force fitted into the inlet passage 6 for the product.

The body 1 comprises a cylindrical chamber 7 having one end connected via an orifice 8 to the inlet passage 6 and the other end, opposite said orifice 8, closed by a cap 9 through which the stem 10 of a control push member is slidably fitted, the head 11 of this push member being thus disposed externally of said body 1. In the arrangement illustrated the head 11 comprises a dispensing nozzle 12 having its outlet orifice directed downwardly for dispensing the product. Moreover, this head 11 incorporates a spring-loaded valve member adapted to open automatically when the product contained in the chamber of the device is compressed therein, as will be explained presently.

Another valve member 13 normally closes the inlet orifice 8 of chamber 7. However, this valve member is adapted to operate in the opposite direction with respect to the valve member of push member 10; in other words, valve member 13 opens during the suction of a metered quantity of product into the device, and remains closed when this quantity is subsequently forced out from the device. For this purpose, this valve member 13 is located downstream of the inlet orifice 8 and responsive to a thrust spring 14.

The suction and delivery member mounted within the chamber of the device comprises essentially an accordion-pleated or bellows-like tube 15 of resilient plastic material such as natural or synthetic rubber, or any other suitable material, notably according to the chemical properties of the product to be dispensed.

At its end adjacent the input orifice 8 this tube 15 comprises an external flange 16 adapted to act as a seal by engaging a matching shoulder formed in the bottom of chamber 7. This shoulder may advantageously comprise a circular groove 17 engageable by a corresponding circular rib formed on the registering face of flange 16. The opposite end of this tube is fastened by means of suitable shouldered or flanged end piece 18 to the corresponding end of the stem 10 of the control push member. This end piece 18 comprises an axial or central bore 19 aligned with a similar axial passage formed in the stem 10 of the control push member in order to permit the flow of metered product to be dispensed.

The pleated or bellows-like tube 15 is enclosed in a rigid sleeve having several specific functions. This sleeve comprises two complementary portions 20 of substantially semi-cylindrical configuration (see FIG. 4).

At their ends adjacent the head 11 of the push member these portions 20 are each formed with an external shoulder 21 engaged by the shoulder or flange of cap 9. Thus, when the latter is screwed home, it forces the sleeve 20 into the chamber of the device and causes its opposite end to engage the flange 16 of bellows 15 in order to form a fluid-tight seal therewith.

Preferably, a rigid ring 23 for example of suitable plastic material is interposed between the corresponding end of sleeve 20 and said flange 16. Thus, the sleeve 20 causes the flange 16 to be firmly pressed against the bottom of chamber 7 and a reliable, efficient fluid-tightness is obtained.

However, it is another function of sleeve 20 to guide the bellows 15 during the contraction and expansion thereof, in order to avoid any risk of undesired or detrimental distortion of this bellows. Another function of bellows 15 consists in properly guiding the stem 10 of the control push member. For this purpose, the two complementary portions 20 of sleeve 20 comprise each beyond the external shoulder 21 an end projection 24 engaging the aperture of cap 9.

These two projections are each formed with a V-sectioned longitudinal slot 25 forming a square-sectioned passage engaged by the stem 10 having a matching cross-sectional contour. Thus, this stem 10 is guided during its movements and prevented from rotating about its axis, so that the outlet nozzle remains constantly directed as shown, that is, downwardly.

Finally, a return spring 26 is enclosed in the bellows-like tube 15 for constantly urging the latter to its normal expanded or waiting position as shown in FIG. 2. At one end, this coil-compression spring bears against a shoulder formed in a cylindrical member 27 supporting the valve 13, a plurality of openings 28 being formed in this member to permit the flow of product to be dispensed therethrough. At its opposite end, the spring 26 reacts against the end piece 18 carried by the stem 10 of the control push member.

In the normal waiting position the spring 26 urges the end piece 18 for engagement with an internal shoulder 29 formed in the corresponding end of the sleeve. Thus, the pleated tube is held in its extended condition (see FIG. 2) and the head 11 of the control push member is maintained at a distance E from the adjacent end of the body 1 of the device.

For dispensing a metered amount of product through the nozzle 12 it is only necessary to push the head 11 of the push member in the direction of the arrow F, thus causing the end piece 18 to slide inwardly in the sleeve 20 and contracting the bellows 15 of resilient material substantially to the position show in FIG. 3.

The metered quantity of product previously contained in this tube is thus compressed. The pressure exerted by this product against the valve incorporated in the head 11 of the push member causes this valve to open, so that the metered amount of product is allowed to flow to the outside. During this operation, the other valve member 13 is firmly seated by the pressure prevailing in the product thus delivered, and any back flow of product to the reservoir is safely prevented.

When the push member is released, the spring 26 forces the end piece 18 back in the direction opposite to that shown by the arrow F, until said end piece resumes its waiting position shown in FIG. 2. This movement permits the expansion of the pleated or bellows-like tube 15 which resumes its initial position, after having been kept in its contracted condition. This is attended by a suction causing the opening of valve 13 and the ingress of a metered quantity of product into the bellows 15.

In fact, the capacity receiving the metered quantity of product to be dispensed consists of the inner cavity of said pleated tube or bellows 15. This quantity of product will thus remain in a waiting condition within the device until the latter is operated again, i.e. until the push member thereof is actuated again by the same or another user, so that the device is constantly ready to operate.

It will be readily understood that the exact volume of metered product to be dispensed depends on the magnitude of the contraction of the bellows 15 and therefore on the amplitude of the stroke applied to push member 10-12.

According to an improved embodiment of this device, a set of several different abutment members adapted to modify the useful or operative stroke of push member 10-12 is provided. Each abutment member may be slipped on the stem 10 of the push member for reducing more or less the useful stroke thereof. These abutment members may consist for example of riders adapted to be fitted on stem 10 and held against axial movement thereon by means of notches or other relief portions provided on the stem surface. Two such riders are shown in FIG. 2 by dotted lines and identified by reference numerals 10' and 10".

The use of a delivery and suction member consisting of a pleated resilient tube 15 instead of a conventional rigid piston provided with a piston seal constitutes a satisfactory solution to all the fluid-tightness problems encountered in prior art devices of this character, and more particularly eliminates the risk of faulty operation due to an abnormally rapid wear and tear of the seal or seals.

However, another important feature characterizing the device of this invention is its great facility of use. This is also due to the substitution of a pleated or bellows-like tube 15 acting as a delivery and suction member for the hitherto conventional rigid control piston. In fact, when a rigid piston is used, the effort required for delivering the same amount of product is considerably greater.

On the whole, the device according to the present invention operates in a manner considerably more satisfactory than hitherto known devices of this type. However, actual service proved that some slight leakages tend to develop around the valve member associated with the outlet nozzle incorporated in the control push member. Similarly, priming the device also proved to be difficult with the valve controlling the communication between the inner space of the bellowslike tube and the reservoir, so that some water had to be added for facilitating this priming. These difficulties are more pronounced with using pasty or high-viscosity products, in comparison with the dispensing of liquid products.

Figure 5:
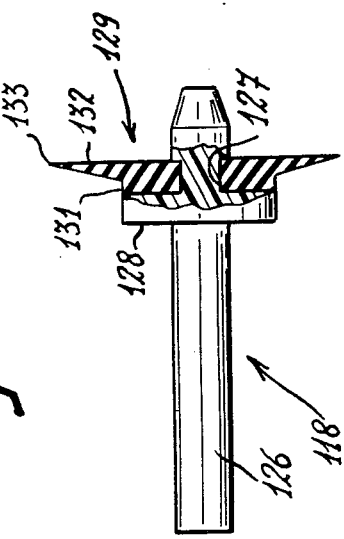
FIG. 5 is a side-elevational, part-sectional view showing on a larger scale the valve member controlling the passage of product from the reservoir (shown only in phantom lines in FIG. 1) to the dispensing chamber.
Figure 7:
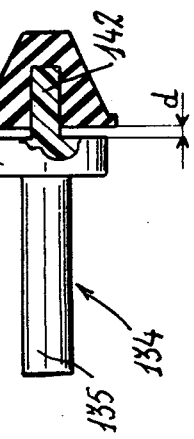
FIG. 7 is a side elevational and part-sectional view showing on a larger scale a valve member engaging the outlet nozzle of the push member shown in FIG. 6.

It is therefore another object of this invention to provide means capable of eliminating these drawbacks; more particularly, the valve means illustrated in FIGS. 5 to 7 of the attached drawing are directed to avoid these inconveniences by using an improved control valve disposed between the reservoir and the inner cavity of the pleated tube and adapted to ensure a satisfactory, efficient priming action irrespective of the viscosity of the product to be dispensed.

Referring first to FIG. 5, the valve member 118 illustrated therein is disposed downstream of the inlet orifice 8 and adapted to operate as in the preceding form of embodiment, that is, to open during the suction of a metered amount of product into the device, and to remain closed while this amount is subsequently delivered through the outlet nozzle 12.

This valve assembly 118 comprises a rigid stem of relatively hard synthetic material formed with an annular groove 127 at its end. This groove is located in close vicinity of a flange 128 surrounding said stem, and a valve member or seal 129 of flexible material is embedded in said retaining groove 127 for completing the valve assembly 118.

The valve or seal 129 comprises a reinforcing portion 131 coaxial to the supporting stem 126 and adapted to bear against said flange 128 rigid with stem 126 when the valve assembly 118 closes the orifice permitting otherwise the communication between the pleated or bellows tube 15 and the reservoir containing the product. The seal 129 further comprises an outer peripheral portion 132 of a thickness decreasing from said reinforcing portion 131 to the outermost edge 133 of the seal, the radial section of this outer peripheral portion 132 being preferably bevelled as illustrated in FIG. 5.

The seal 129 may be made from any suitable synthetic material.

It is clear that substituting this seal for the valve means provided in the device shown in FIGS. 1-4 produces in actual operation a suction and therefore a priming action promoting very efficiently the ingress of product into the cavity of the bellows-like tube, even if a high-viscosity product is to be dispensed.

The other valve 134 illustrated in FIGS. 6 and 7 is mounted in the head 111 of the push member and controls the ejection of product through the nozzle 12 when the head 111 is depressed for compressing the pleated or bellows-like tube 15.

The nozzle 12 consisting of synthetic material like the stem 10 of the push member is screwed on said stem 10 and contains the stem 135 of valve 134, the latter being constantly urged to the position in which it closes the outlet passage 136 by a return spring 137 disposed coaxially to said stem 135. For this purpose, the spring 137 reacts against an inner shoulder of nozzle 12 which is coaxial to the outlet orifice 138 thereof and constantly urges with its end opposite this outlet orifice 138 an annular flange or like projection 139 disposed across said stem 135.

According to a specific feature of this modified embodiment the valve 134 carries a substantially frusto-conical valve member or seal 141 of flexible material fitted coaxially on an end stud or pin 142 forming the extension of said stem 135 on the opposite side of said transverse flange 139 interposed between the stud 142 supporting the valve member or seal 141 and said stem 135.

The valve member or seal 141 has formed around its major base an annular bead 143 of a diameter considerably greater than that of said cylindrical flange 139 and adapted to engage a corresponding annular valve seat 144 formed within the head 111 coaxially to the outlet passage 136. As clearly shown in FIG. 6, the transverse flange or projection 139 and the sealing bead 143 are housed in a cylindrical chamber formed internally of said head 111, between the passage 136 and the outlet orifice 138.

According to a complementary feature characterizing the valve of FIGS. 6 and 7, a slight clearance is left between the flange 139 and the registering face of valve member 141. The latter, like the seal 129 of valve assembly 118, may advantageously consist of synthetic rubber having a sufficient resistance to corrosive substances.

The device for dispensing liquid and semi-liquid or pasty products according to the modified embodiment shown in FIGS. 5 to 7 of the drawing operates substantially like the device of FIGS. 1 to 4, and therefore it is not deemed necessary to describe this operation in detail. It is only necessary to mention the fact that when the push member is caused to slide by depressing the head 111 thereof in the direction of the arrow F in order to compress the pleated tube 15, the product contained therein is expelled through the cavity of stem 10 into the outlet passage 36. Thus, the pressure exerted by the product will unseat the valve member 141 whereby the product will penetrate into the nozzle 12 from which it emerges through its orifice 138. Immediately after the metered quantity of product contained in pleated tube 15 has been thus expelled or forced out, spring 137 will return the valve member 134 to its initial position in which it closes the passage 136. In this position, the flexibility of the material constituting the valve member 141 enables the latter to accomodate closely any possible unevennesses of its seat 144, thus providing in conjunction with the annular bead 143 a very reliable fluid-tightness preventing substantially any leakage of product through the outlet nozzle between two successive actuations of the push member.

These advantageous results are obtained through the combination of the valve member or seal 141 with a slight clearance $d$, for example of the order of one millimeter, between this valve member or seal 141 and the registering face of the transverse flange 139 associated therewith.

After expelling a metered quantity of product, the spring 116 returns the pleated tube 15 and push member 10, 11 to their initial positions, thus producing a suction attended by the opening of valve 118. The stem 126 thereof will thus move away from the inlet orifice 8 and carry along the seal 129. It will be seen that the thinner peripheral portion 132 of this seal 129 increases very considerably the suction action permitting of priming with greater facility the introduction of product, contained in the reservoir, into the pleated tube 15. This advantageous suction effect is obtained even when high-viscosity or pasty products are to be dispensed, such as creams, mayonnaise and the like.

The valves 118 and 134 may be constructed in a manner differring from the structures illustrated.

Thus, the seal 141 may have if desired a tapered configuration instead of the frustoconical shape illustrated.

As already mentioned in the foregoing, the device of the present invention may be used for dispensing miscellaneous pasty or liquid products. Thus, it is suitable for dispensing liquid soap, pasty cleaning products, creams for the protection of the skin, and the like. It may also be used for very different types of applications, such as the dispensing of mustard, mayonnaise or any other food products in the pasty or liquid state.

What is claimed as new and desired to be protected by Letters Patent is set forth in the appended claims:

1. A device for dispensing metered amounts of liquid or pasty products, which comprises
   a chamber communicating through a pair of valve means on the one hand with an orifice opening into a reservoir containing the product to be dispensed, and on the other hand with an outlet nozzle,
   a delivery and suction member disposed within said chamber and consisting of a tube of resilient material pleated accordion-like and having one end engaging in a fluid-tight manner the edge of an inlet orifice opening into said chamber,
   a control push member comprising a hollow stem rigid with the other end of said tube of resilient material, said push member also incorporating said outlet nozzle for ejecting the product,
   a return spring disposed internally of said pleated tube and constantly urging said pleated tube and push member to their inoperative positions, and
   a rigid sleeve coaxial to and enclosing said resilient pleated tube, one end of said sleeve engaging the tube end held in a fluid-tight manner against the edge of the inlet orifice of the chamber of the device, the other end of said sleeve being rigid with the corresponding end of said chamber adjacent said control push member.

2. A device as recited in claim 1, wherein said sleeve surrounding said pleated tube acting as a delivery and suction member consists of two matching halves assembled along a diametral plane, the sleeve end adjacent said push member reacting against a cap closing the adjacent end of said chamber.

3. A device as recited in claim 2, wherein the two matching halves of said sleeve comprise each an end projection formed with inner grooves defining a polygonal contour surrounding the stem of said control push member, said stem having a corresponding cross-sectional contour.

4. A device as recited in claim 1, wherein the end of said pleated tube which is adjacent said inlet orifice comprises an external flange acting as a seal which is engageable by said rigid sleeve surrounding said pleated tube.

5. A device as defined in claim 4, wherein a washer is interposed between said external flange of said pleated tube and said rigid sleeve.

6. A device as defined in claim 5, wherein said washer is rigid.

7. A device as defined in claim 6, wherein said washer is semi-rigid.

8. A device as recited in claim 1, wherein a set of several detachable abutment members of different length, adapted to be fitted around said control push member, are provided to permit the desired adjustment of the operative stroke of said push member and therefore of the amount of product ejected during each actuation of the device.

9. A device as recited in claim 1, wherein the valve controlling the orifice connecting the inner space of said pleated tube to the reservoir containing the product to be metered and dispensed consists of a stem formed with an end annular retaining groove adjacent a flange surrounding said stem, and a seal of flexible material fitted in said retaining groove.

10. A device as recited in claim 9, wherein the valve seal comprises a reinforcing element coaxial to its supporting stem and arranged for reacting against the transverse flange of said stem when the valve closes the communication between said pleated tube and the reservoir, said seal further comprising a peripheral annular portion of a thickness decreasing gradually from said reinforcing element to the outermost edge of said seal.

11. A device as recited in claim 10, wherein said other valve member is disposed in the head of said control push member and adapted to control the ejection of the product through an outlet nozzle, said other valve member comprising a seal of flexible material said seal being fitted axially on an end stud projecting from the stem of a support which carries an annular transverse projection adjacent said stud.

12. Device as recited in claim 11, wherein a slight clearance is reserved between said annular projection and the registering face of said seal.

13. A device as defined in claim 11, wherein said seal of said other valve member has a tapered configuration.

14. A device as defined in claim 11, wherein said seal has a frustoconical configuration.

15. A device as defined in claim 10, wherein said peripheral portion of said seal has a bevelled cross section.

16. Device as recited in claim 9, wherein said seals of said pair of valves consist of synthetic rubber selected to have a sufficient resistance to corrosive liquids.

* * * * *